United States Patent [19]

Rabinowitz et al.

[11] 4,361,770

[45] Nov. 30, 1982

[54] TECHNIQUE FOR SYNCHRONIZATION OF RAMAN SCATTERED RADIATION

[75] Inventors: Paul Rabinowitz, Old Bethpage, N.Y.; Bruce N. Perry, Maplewood, N.J.

[73] Assignee: Exxon Research and Engineering Co., Florham Park, N.J.

[21] Appl. No.: 216,203

[22] Filed: Dec. 15, 1980

[51] Int. Cl.³ .............................................. H03F 7/00
[52] U.S. Cl. ........................................ 307/426; 372/3
[58] Field of Search ..................... 307/425, 426; 372/3

[56] References Cited

U.S. PATENT DOCUMENTS

| | | | |
|---|---|---|---|
| 4,091,290 | 5/1978 | Bjorklund et al. | 307/425 |
| 4,151,486 | 4/1979 | Itzkan et al. | 372/3 |
| 4,245,171 | 1/1981 | Rabinowitz et al. | 307/426 |

Primary Examiner—David C. Nelms
Attorney, Agent, or Firm—Richard I. Samuel

[57] ABSTRACT

A device is disclosed for producing a pair of synchronized intense 16 micron pulses in which stimulated rotational Raman scattering together with four wave mixing and pulse compression takes place in parahydrogen on an off-axis path between a pair of spherical mirrors.

8 Claims, 7 Drawing Figures

TECHNIQUE FOR SYNCHRONIZATION OF RAMAN SCATTERED RADIATION

FIELD OF THE INVENTION

This invention relates to optical pulse generation devices and particularly to devices employing Raman scattering to generate high intensity optical pulses.

BACKGROUND OF THE INVENTION

It is useful for a number of physical and chemical processes to have available highly synchronized pulsed coherent radiation of differing optical frequencies. One is often faced with the requirement to excite a molecule or an atom with a combination of frequencies within a short time period in order to effect transitions to a given state of a molecular system, e.g., to achieve selectivity in an isotope separation process or to prepare a system for a chemical reaction. Although many processes can be excited stepwise and sequentially in time, it is usually the case that the most efficient stepwise excitation for radiatively connected states occurs with both radiation fields simultaneously applied. This is because in most cases collisional, radiative or transit-time decay reduces the population of the available species for the second step of excitation. The ability to synchronize two or more laser sources can be the most significant factor in determining the efficiency of such processes.

In general, it is difficult to obtain a high degree of synchronization between short pulses of laser light. For electrically excited gaseous discharge lasers which use thyratron control of the discharge firing, the discharges are initiated within a few nanoseconds. However, subsequent fluctuations in the buildup time of the optical pulses, which depend upon the resonant conditions, the electrical current, and the gas compositions and densities, produce typical overall interpulse jitter of from 10 to 50 nanoseconds. For generation of synchronized pulses shorter than 50 ns in duration, this degree of jitter would be unacceptable.

We now consider the generation of optical pulses through stimulated Raman scattering where the relative jitter between the output pulses is directly attributable to the jitter in the optical pump pulses which initiate the process. When a strong excitation pulse (Pump Pulse) is applied to a medium which is Raman responsive, stimulated scattering of the pump pulse results in the growth of radiation (Stokes pulse) which is downshifted by the Raman frequency of the medium and propagates in the pump direction. (In general, a Stokes pulse may grow in the opposite direction, but the physical structures that we shall consider do not allow such a pulse to develop.) The copropagating Stokes pulse is initiated by spontaneous Raman scattering and grows at an exponential rate that is proportional to the intensity of the pump pulse until pump depletion occurs or the medium has been traversed terminating the process. Energetically, for every quantum of energy appearing at the Stokes frequency a quantum of energy is removed from the pump and the energy difference defined by the Raman frequency is absorbed by the medium. This energy appears as an additional nonpropagating coherent excitation of the medium, known as the Raman wave, which provides a coupling mechanism between the two propagating electromagnetic waves. In general, within the limits imposed by dispersion, the Stokes pulse will copropagate with the depleted pump radiation and will become most intense at a point near the initial peak of the pump radiation. There is an intensity threshold for the appearance of the Stokes pulse. The threshold first occurs near the peak of the pump pulse. Usually, because of the limitations in gain or the presence of competing scattering processes, the width of the Stokes pulse is considerably less than that of the pump and the photon conversion efficiency is much less than 100%.

If a third electromagnetic wave at a frequency greater than the Raman frequency is injected colinearly with the pump wave when the Raman wave is present, a fourth electromagnetic wave shifted by the Raman frequency will be generated even if the intensity of the third wave is in itself insufficient to produce threshold gain for conversion to Stokes radiation. The fourth wave is produced by scattering from the Raman wave already present and therefore does not require the high gain needed to build from noise to threshhold. This physical scattering process is commonly called four wave mixing. Four wave mixing occurs only where the Raman wave overlaps the new pump (third) wave both in time and space within the limits of the transient response time of the medium. Therefore, the fourth wave (new Stokes wave) is completely overlapped (synchronized) with the Stokes wave generated in response to the pump wave. However, it can be seen that if the new pump (third) wave has a duration which is long compared with the first pump, the overall efficiency for the four wave mixing process will be small because only a small fraction of the total energy of the new pump will be converted. Additionally, in the presence of jitter, the two pump peaks may be displaced in time, further degrading the conversion efficiency.

For many useful Raman media, the stimulated Raman gain at practical pump laser intensities is insufficient for the Stokes radiation to reach threshold when starting from quantum noise in a single focused pass through the medium. It has been shown in U.S. patent application, Ser. No. 25,401, filed Mar. 30, 1979 (now U.S. Pat. No. 4,245,171) (this patent is incorporated herein by reference as though fully set forth herein) which issued to Messrs. Rabinowitz and Stein and which is entitled "Device for Producing High-Powered Radiation Employing Stimulated Raman Scattering in an Off-Axis Path Between a Pair of Spherical Mirrors" and also in an article entitled "Efficient tunable $H_2$ Raman Laser" by Messrs. Rabinowitz, Stein, Brickman and Kaldor, which appeared in *Applied Physics Letters,* 35 (10), Nov. 15, 1979 at page 739 (which article is incorporated herein by reference as though fully set forth herein), that a multiple pass cell may be used to increase the cumulative gain so that threshold may be reached with pump intensities far below those required for a single pass device.

It was also found, as described in an article entitled "Controllable Pulse Compression in a Multiple-Pass-Cell Raman Laser", by Messrs. Perry, Brickman, Stein, Treacy and Rabinowitz, which appeared in *Optics Letters,* Volume 5, No. 7, July 1980 at page 288 (which article is incorporated herein by reference as though fully set forth herein), that in such a multiple pass cell, the energy in the Stokes pulse is compressed in time in comparison with the pump pulse as a result of ray crossings associated with the geometry of the multiple pass cell. In such a device, provided the length of the pump pulse extends over several passes of the cell, a forward propagating pump wave will intersect itself many times on each pass, and the intersection regions of the pump will be spaced at regular time intervals as indicated in Table I of the Perry et al article on page 289. During the initial buildup of the Stokes radiation from noise, the beam crossings have only small effect on the Stokes growth and threshold is reached near the peak of the pump pulse after a number of passes. The resulting Stokes pulse then interacts strongly at crossings with the intersecting pump radiation as allowed by the cell geometry. This interaction has two effects. First, energy is extracted from regions of the pump that are spaced away from the region where threshold is first reached by the time intervals between crossings. This suppresses the growth of copropagating Stokes radiation in those regions. Second, as the Stokes wave continues to grow, the threshold region broadens until its width is limited by the pump depletion produced by the crossings. Thus, a single Stokes pulse develops and has a width determined by the time difference between the peak and the nearest crossing (approximately 8/3 passes of the multiple pass cell). This pulse extracts energy from regions of the pump which would not have reached threshold in a device lacking crossings, but having the same cumulative gain. For strong interactions to occur at the crossings, it is necessary that the gain due to the intersecting pump be high. Such gain is maximized for a given intensity of the intersecting pump when the Raman gain is isotropic, and when the length of the crossing region is maximized.

In an article entitled "16-$\mu$m Generation by $CO_2$-Pumped Rotational Raman Scattering in $H_2$" by Messrs. Byer and Trutna, appearing in *Optics Letters*, Volume 3, No. 4, October 1978 at page 144 (which article is incorporated herein by reference as though fully set forth herein), an apparatus was described in which four wave mixing occurs in a multiple pass cell. A Nd:Yag laser is employed to generate a Raman wave in parahydrogen to initiate Stokes radiation from a $CO_2$ laser pulse which is simultaneously passed therethrough. The Nd:Yag laser pulse is short in time compared to the single pass transit time of the multiple pass cell.

BRIEF DESCRIPTION OF THE INVENTION

In accordance with the present invention an efficient device for improving the degree of synchronization between optical pulses is achieved through the proper combination of the physical phenomena discussed above, namely the stimulated Raman scattering, four wave mixing and pulse compression in a multiple pass cell.

The apparatus of this invention is responsive to a pair of at least partially overlapping optical pulses for generating a second pair of optical pulses. The apparatus includes a medium capable of producing stimulated scattering of radiation occupying a volume and reflectors for defining a multiple pass optical path through the volume which intersects itself. The apparatus also includes optics for directing a first of said first pair of optical pulses along the optical path and optics for directing a second of said first pair of optical pulses along the optical path. Each of the first pair of optical pulses have a full width at half maximum equal to or greater than the transit time of each of said optical pulses for one pass of the multiple pass optical path defining structure.

In the preferred embodiment of this invention the full width at half maximum of each of the first pair of optical pulses is at least 8/3rds of the transit time of the respective pulses for one pass of the multiple pass optical path defining structure.

DESCRIPTION OF THE DRAWINGS

For a more complete understanding of the invention reference should be made to the following detailed description and drawings wherein:

In FIGS. 3 and 4 dashed lines are used to show the shape of the original pulses as shown in FIG. 2 prior to depletion in accordance with this invention.

DETAILED DESCRIPTION OF THE INVENTION

Figure 1:
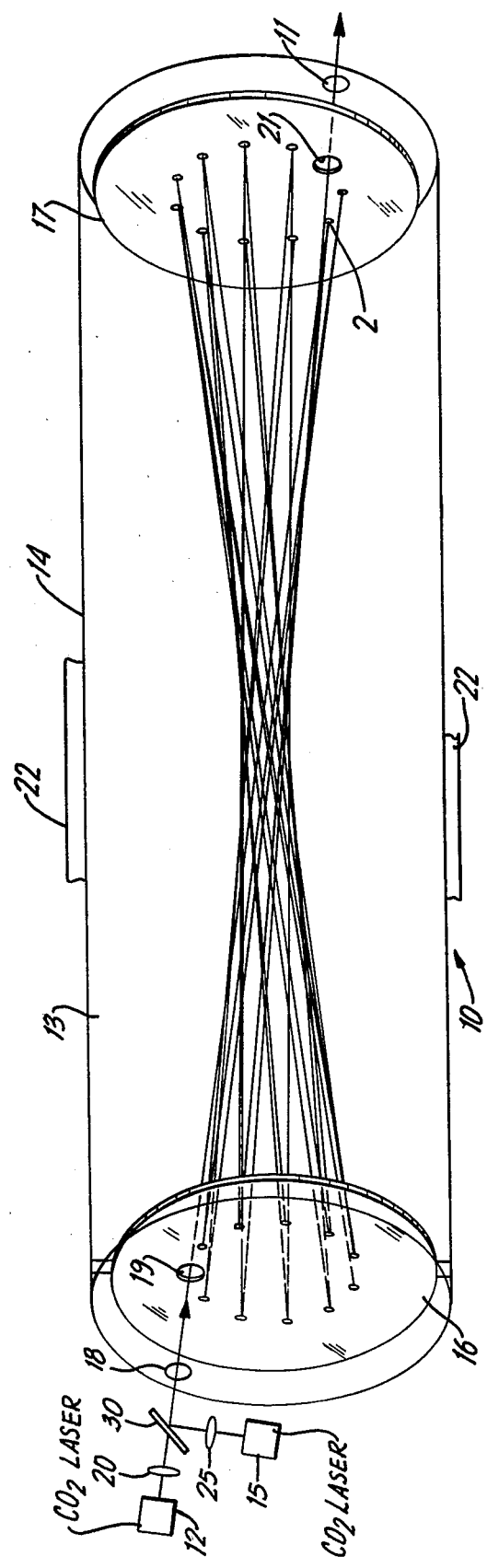
FIG. 1 is a view partially in cutaway isometric form, partially in schematic form, showing a device constructed in accordance with the teachings of this invention.
Figure 2:
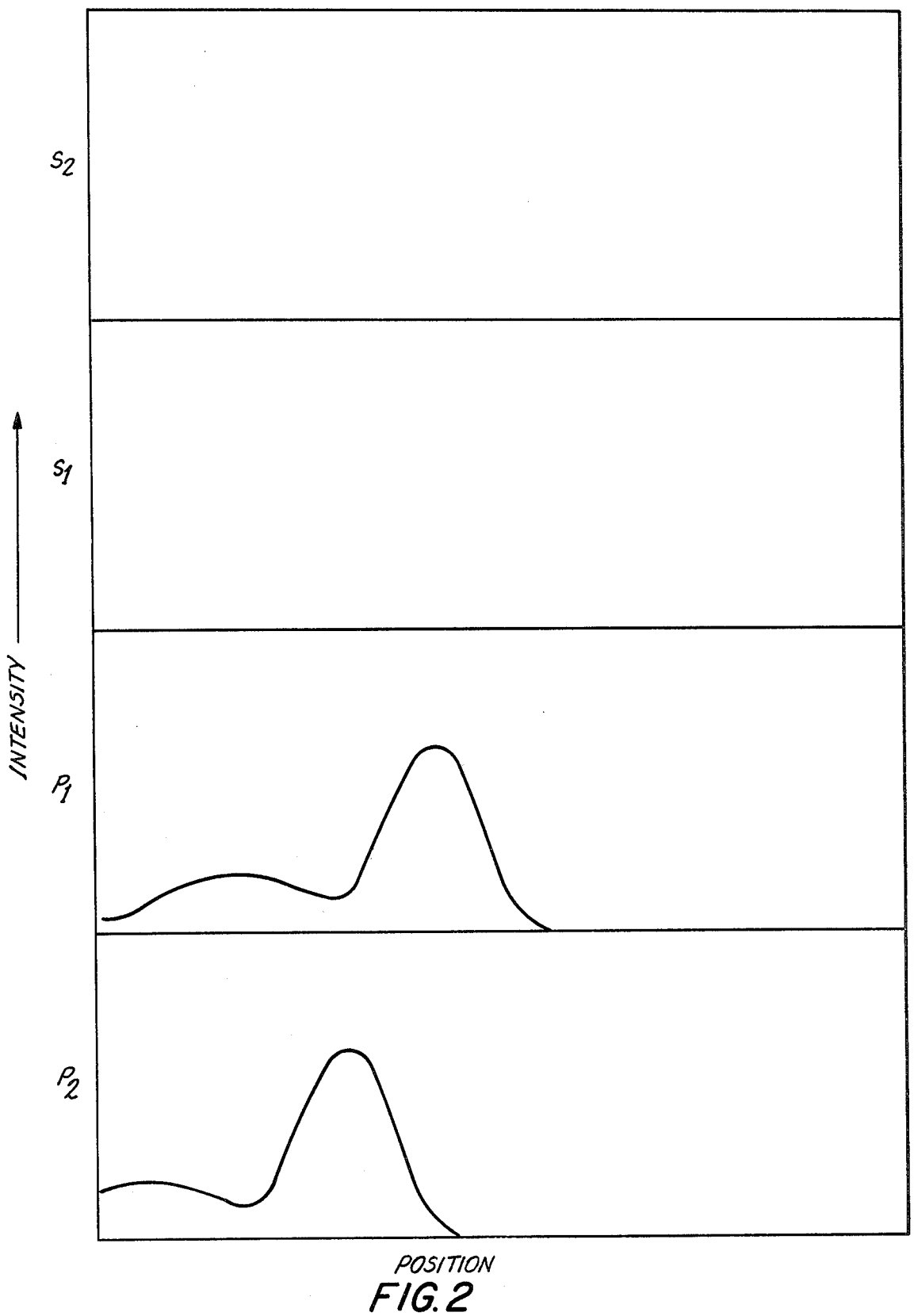
FIGS. 2, 3 and 4 are graphs of intensity of various pulses in various position within the apparatus of FIG. 1 which demonstrate the operation of the apparatus of this invention.
Figure 3:
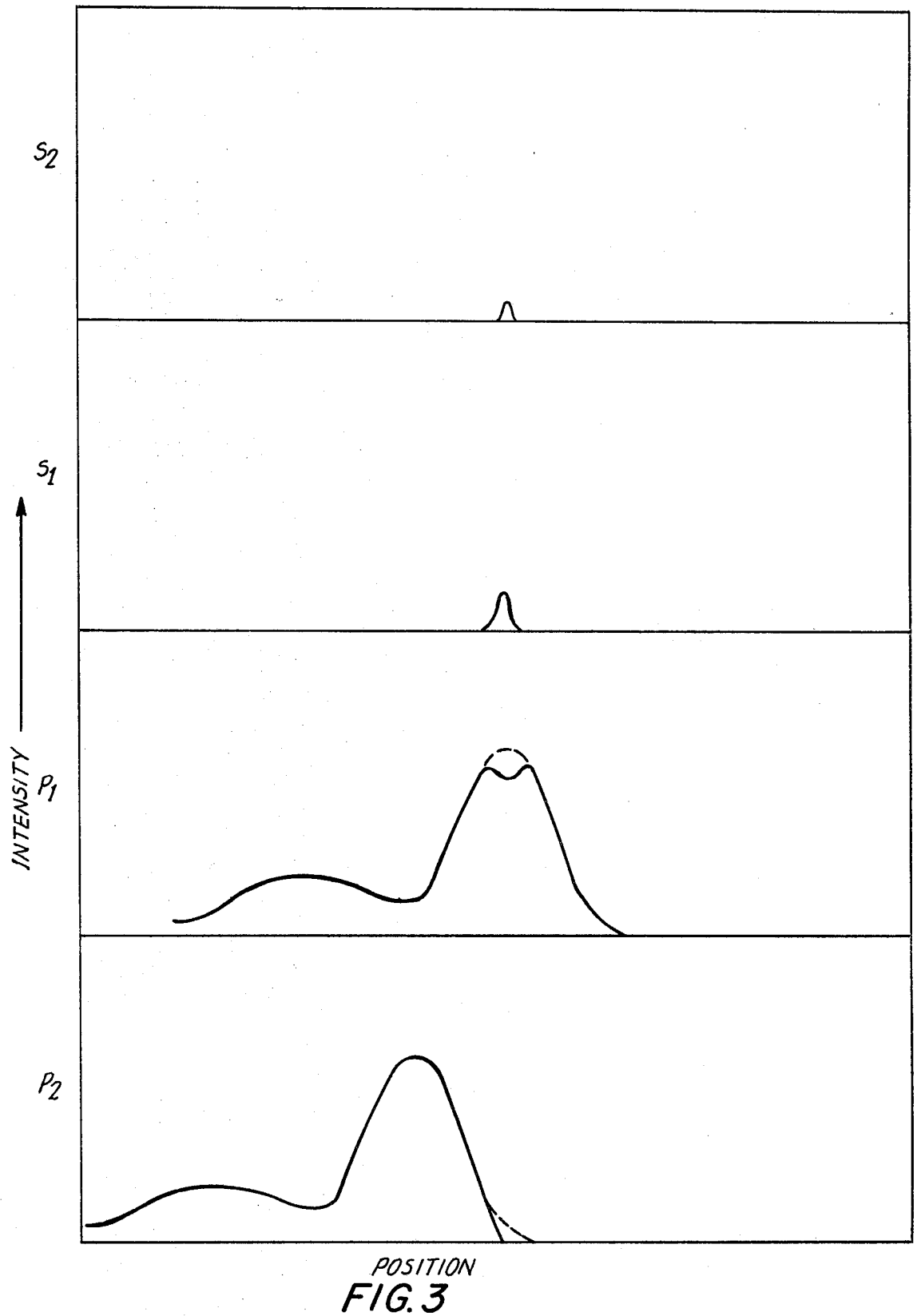
Figure 4:
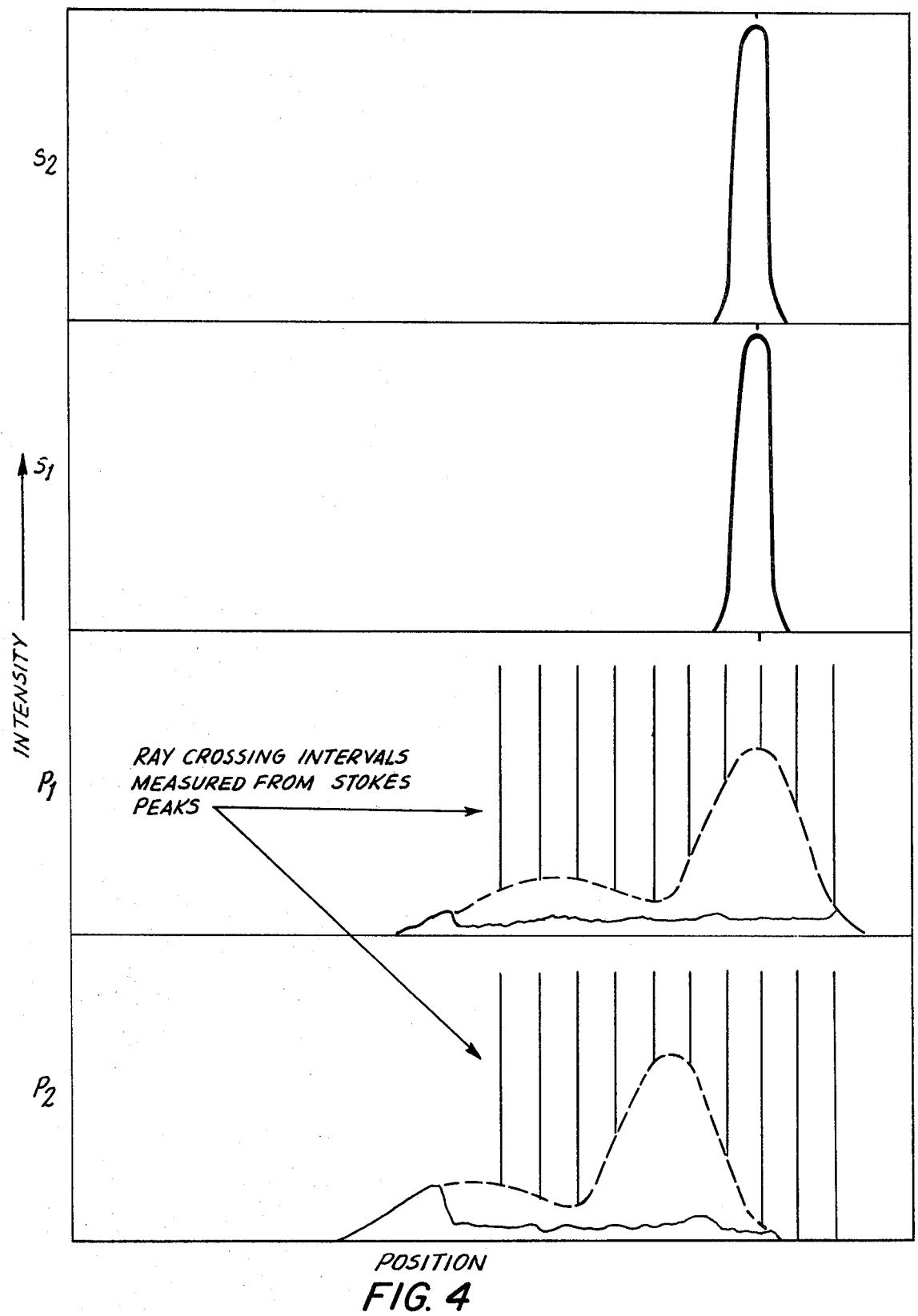

Referring now to FIG. 1, we see a device 10 which provides a pair of high-powered 16 micron radiation pulses ($P_1$ and $P_2$ in FIGS. 2, 3 and 4) through an exit port 11 by stimulated Raman scattering of $CO_2$ laser radiation (provided by $CO_2$ lasers 12 and 15) in parahydrogen 13 maintained in a chamber 14 between a pair of spherical mirrors 16 and 17. The $CO_2$ laser radiation from the $CO_2$ lasers 12 and 15 is passed through lenses 20 and 25 and combined by a beam combiner 30 (which could be a diffraction grating, dichroic beam splitter or prism). The combined beam passes through an entrance port 18, a hole 19 in the spherical mirror 16, reflects between the mirrors 16 and 17 as shown in FIG. 1, and passes out through a hole 21 in the spherical mirror 17 to the exit port 11. The structure defined by the mirrors 16 and 17 shall be referred to as a multiple pass cell. The lenses 20 and 25 mode match the radiation from the $CO_2$ lasers 12 and 15 respectively to the multiple pass cell.

The spherical mirrors in the preferred embodiment of this invention have the same radius of curvature and are mounted with their concave reflecting surfaces facing each other, thereby defining an optical axis including their centers of curvature with the optical axis so defined intersecting the concave reflecting surfaces of the spherical mirrors 16 and 17 preferably through the centers thereof. The center of curvature of the concave reflecting surface of the spherical mirror 16 is located between the concave reflecting surface of the spherical mirror 17 and its center of curvature. In a like fashion, the center of curvature of the concave reflecting surface of the spherical mirror 17 is located between the concave reflecting surface of the spherical mirror 16 and its center of curvature.

Thus the path traveled by the combined radiation through the multiple pass cell intersects itself repeatedly prior to exiting at the exit port 11.

In the preferred embodiment of this invention, the combined power provided by the $CO_2$ lasers 12 and 15 is 40 megawatts in the $TEM_{oo}$ mode. The pulse length of each of the pulses is 100 nanoseconds. In order to employ these pulses in the chamber 10 the pulses are circularly polarized in the same sense by devices, not shown in the preferred embodiment of this invention. The spacing between the mirrors 16 and 17 is 373 centimeters.

As seen in FIG. 1, the radiation from the $CO_2$ laser 12 is directed through the hole 19 in the mirror 16 to strike the mirror 17 at the point numbered 2. It should be appreciated that the point 2 and the center of the hole 19 are equidistant from the optical axis. In the example shown, the radiation passes between the mirrors 16 and 17 twenty-one times before exiting. The number of passes between the mirrors 16 and 17 is determined by the radius of curvature of the mirrors 16 and 17 and the spacing therebetween. The distance between the mirrors is 373 centimeters; the radius of curvature is 203 centimeters.

In operation, as pointed out above, the pulses $P_1$ and $P_2$ from the $CO_2$ lasers 12 and 15 are synchronized as well as practical by prior art synchronization techniques. Notwithstanding the above, jitter in the order of magnitude of 50 nanoseconds is still present. Thus the pulses $P_1$ and $P_2$ are separated in time but the leading edge of the second pulse $P_2$ overlaps the peak of the first pulse $P_1$.

Threshold is reached first by Stokes wave $S_1$ (see FIG. 3), close to the peak of the pump $P_1$. The small leading edge of $P_2$ scatters by four wave mixing from the Raman wave produced by the stimulated scattering of $S_1$, and generates a small but macroscopic wave $S_2$, which is synchronized to $S_1$, see FIG. 3. Through the ray crossing interactions spaced at regular intervals, each of the Stokes waves $S_1$ and $S_2$ continues to grow by extracting energy from its own pump wave, while retaining a high degree of synchronization with the other, see FIG. 4. In this case the centroids of the Stokes pulses $S_1$ and $S_2$ will be closer than the centroids of the pump pulses $P_1$ and $P_2$. In contrast, if $P_1$ and $P_2$ had been passed through separate multiple pass cells or passed through the same multiple pass cell at substantially different times, the temporal behavior of $S_2$ would be determined by the intensity and temporal characteristics of $P_2$ only, and similarly $S_1$ would depend only on $P_1$.

Figure 6:
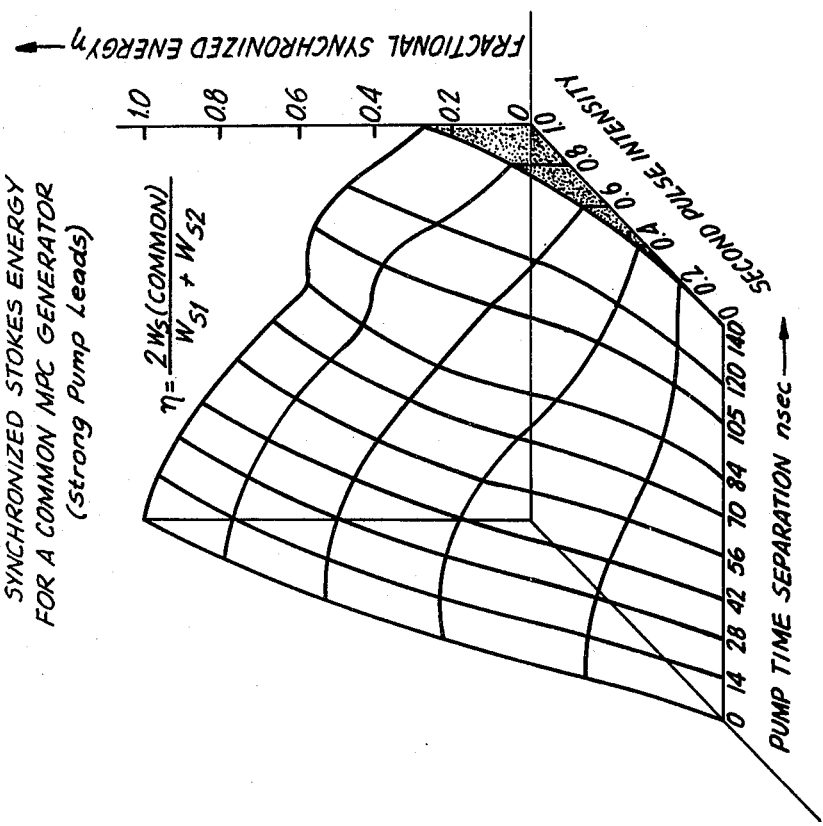
FIGS. 5 and 6 are 3-axis graphs showing the efficiency of the system of FIG. 1 as a function of the time separation between input pulses and the relative intensity of one of the input pulses.
Figure 5:
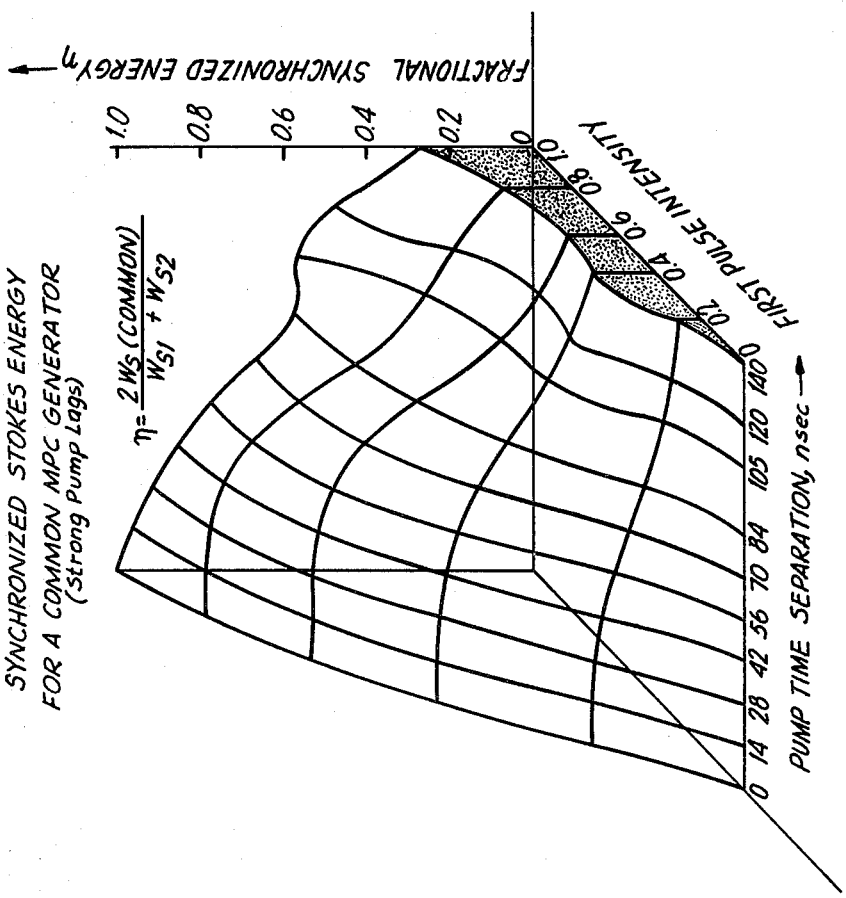
Figure 7:
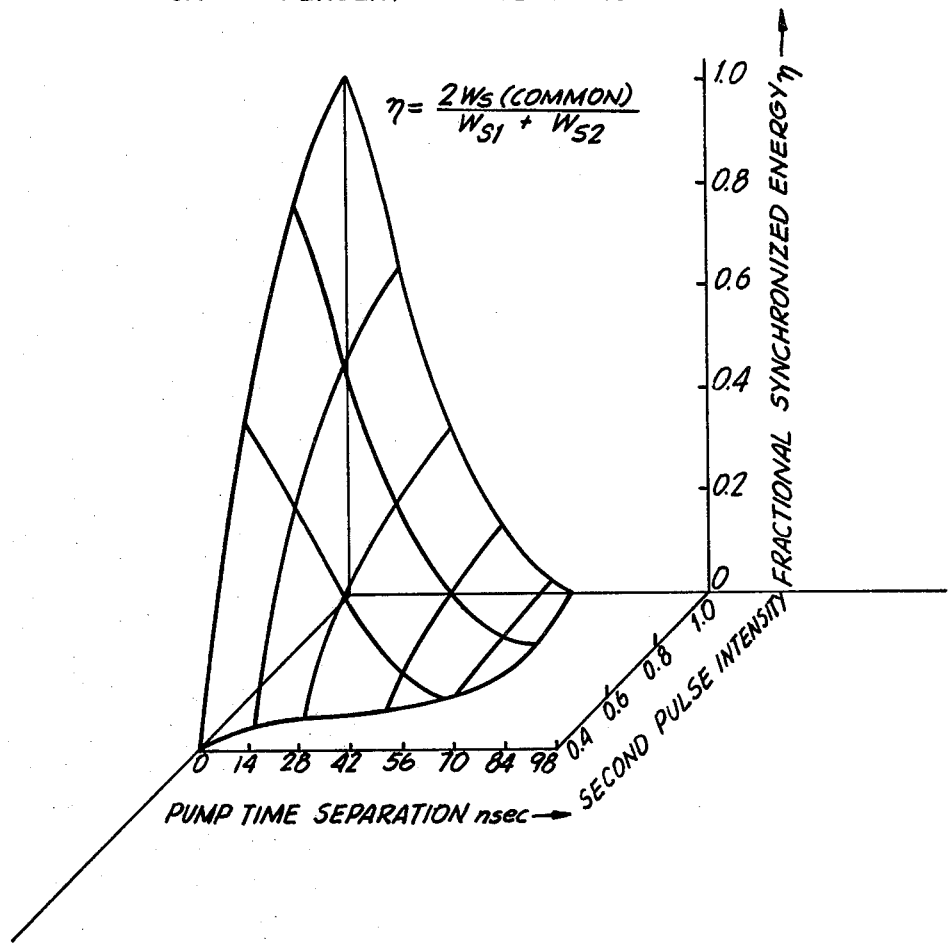
FIG. 7 is a 3-axis graph showing the efficiency of a prior art system for generating pairs of optical pulses.

We have performed a mathematical analysis of the preferred embodiment of the invention. The results demonstrate the improved synchronization obtainable with the invention. We define a merit factor, $\eta$, called the fractional synchronized energy which is twice the common energy of the two Stokes pulses divided by the total Stokes energy at the device output. The common energy is defined as the integral over time of the lesser of the two Stokes intensities at each time. A plot of $\eta$ as a function of pump time separation and relative intensity of the pump pulses is shown in FIGS. 5 and 6 for a pair of pump pulses processed in the apparatus of the preferred embodiment of the invention. This should be compared with the value of $\eta$ in FIG. 7 that is obtained when the same two pump pulses are processed by two independent multiple pass cells, with the cells as described in the aforementioned article entitled "Efficient tunable $H_2$ Raman Laser". Notice, for example, that for two equally intense pulses delayed by 46 ns, typical of jitter that one may expect from spark gaps, the synchronized energy fraction with independent multiple pass cells is 0.10 while with the invention its value is 0.83, an improvement of more than eight fold. Overall, for any value of relative intensities of the pump pulses and/or any relative delay which maintains a degree of pump overlap there is improvement in the amount of synchronized energy with this invention.

It has been found, in general, that in order to achieve high conversion efficiencies, the Raman gain should be sufficiently high so that threshold is reached after about half the number of passes of the multiple pass cell, and the gain should be reasonably isotropic for a strong interaction at the ray crossings. The conditions of temperature and pressure to achieve isotropic gain in various Raman media is well known. In the preferred embodiment, parahydrogen is the Raman medium, the temperature is 77° K. and the pressure is 440 Torr. In the preferred embodiment, the gain is about 18 db per pass for the stronger Stokes wave. Also, each pump wave must have a full width at half maximum of at least the length of a single pass through the multiple pass cell in order to achieve a practical, efficient device. In the preferred embodiment, the length of each pump wave is at least 8/3 passes but less than the total number of passes of the structure. If the pumps have disparate lengths and one of the pump waves is shorter than 8/3 passes, then the photon conversion to synchronized Stokes radiation cannot be complete. Furthermore, if a pump pulse is shorter than one pass, the maximum realizable synchronized conversion efficiency will be less than 37%.

Although this invention has been described with respect to its preferred embodiments, it should be understood that many variations and modifications will now be obvious to those skilled in the art, and it is preferred, therefore, that the scope of the invention be limited, not by the specific disclosure herein, but only by the appended claims.

What is claimed is:

1. Apparatus responsive to a first pair of at least partially overlapping optical pulses for generating a second pair of optical pulses, said apparatus including:
   a medium capable of producing stimulated scattering of radiation occupying a volume;
   means for defining a multipass optical path through said volume, said optical path intersecting itself;
   means for directing a first of said first pair of optical pules along said optical path, said first of said first pair of optical pulses having a full width at half maximum equal to or greater than the transit time of said first of said first pair of optical pulses for one pass of said multipass optical path defining means; and
   means for directing a second of said first pair of optical pulses along said optical path, said second of said first pair of optical pulses having a full width at half maximum equal to or greater than the transit time of said second of said first pair of optical pulses of one pass of said multipass optical path defining means thereby providing said second pair of optical pulses.

2. The apparatus as defined in claim 1 in which said means for defining a multiple pass optical path includes:
   a first spherical mirror having a first concave reflecting surface which is a section of a sphere having a first predetermined radius and a first center of curvature;
   a second spherical mirror having a second concave reflecting surface which is a section of a sphere having a second predetermined radius and a second center of curvature; and
   means for mounting said first and second spherical mirrors with said first and second concave reflecting surfaces facing each other, defining an optical axis including said first and second centers of curvature, said optical axis intersecting said first and second concave reflecting surfaces.

3. The apparatus as defined in claim 2 in which said first center of curvature is located between said second center of curvature and said second concave reflecting surface; and said second center of curvature is located between said first center of curvature and said first concave reflecting surface.

4. The apparatus as defined in claim 3 in which said medium capable of producing stimulated scattering is hydrogen and each of said first and second pair of optical pulses are generated by $CO_2$ lasers.

5. The apparatus as defined in claim 1 in which the first of said first pair of optical pulses has a full width at half maximum equal to or greater than 8/3rds the transit time of said first pair of optical pulses for one pass of said multipass optical path defining means and said second of said first pair of optical pulses has a full width at half maximum equal to or greater than 8/3rds of the transit time of said second of said first pair of optical pulses for one pass of said multiple pass optical path defining means.

6. The apparatus as defined in claim 5 in which said means for defining a multiple pass optical path includes:
   a first spherical mirror having a first concave reflecting surface which is a section of a sphere having a first predetermined radius and a first center of curvature;
   a second spherical mirror having a second concave reflecting surface which is a section of a sphere having a second predetermined radius and a second center of curvature; and
   means for mounting said first and second spherical mirrors with said first and second concave reflecting surfaces facing each other, defining an optical axis including said first and second centers of curvature, said optical axis intersecting said first and second concave reflecting surfaces.

7. The apparatus as defined in claim 6 in which said first center of curvature is located between said second center of curvature and said second concave reflecting surface; and said second center of curvature is located between said first center of curvature and said first concave reflecting surface.

8. The apparatus as defined in claim 7 in which said medium capable of producing stimulated scattering is hydrogen and each of said first and second pair of optical pulses are generated by $CO_2$ lasers.

* * * * *